United States Patent Office 2,902,420
Patented Sept. 1, 1959

2,902,420

GRAFT COPOLYMERS

Ronald George Wreyford Norrish, Cambridge, England, assignor of one-half to The Distillers Company Limited, Edinburgh, Scotland, a British company No Drawing. Application February 6, 1956
Serial No. 563,443

Claims priority, application Great Britain
February 18, 1955

5 Claims. (Cl. 204—158)

The present invention relates to graft copolymers.

"Copolymers," as the term is usually used, covers those polymeric products obtained by the polymerisation of a mixture of two or more monomeric compounds. The resultant copolymers contain the polymerised monomeric groupings of all the monomers present, distributed within the molecule in a regular or random manner in proportions depending on the concentration of the monomers in the original mixture and on the their reactivity ratios. In contrast to this "graft copolymers," as the term is used throughout this specification, covers polymeric products consisting essentially of polymeric chains derived from one polymerisable material (main chains) to which are chemically attached a number of polymeric chains derived from the same or another polymerisable material (branch chains) the branch chains having one end free. This definition includes as "graft copolymers" polymeric materials in which the main chains are themselves copolymers (in the usual sense), and the branch chains are different copolymers (in the usual sense). Particularly useful products are obtained by using completely different polymerisable material in the preparation of the side chains from that which was used in the preparation of the main chains, for in this way graft copolymers are obtained in which the chemical composition of the main chains is different from that of the branch chains and thus interesting blending of properties may result.

It is known that polynuclear aromatic hydrocarbons such as naphthalene and anthracene are transitionally formed into excited triplet states by irradiation with ultra-violet light of suitable wavelength. Furthermore it is described in copending application Serial No. 563,456, filed on even date herewith, that the irradiation of such aromatic hydrocarbons causes the initiation of the polymerisation of polymerisable ethylenically unsaturated compounds.

It has now been found that polynuclear aromatic hydrocarbon residues, even when attached to a polymer chain, may still be activated by irradiation with ultra-violet light and that such activated residues may be used to initiate polymerisation reactions which give rise to graft copolymers.

Accordingly the present invention provides a process for the production of a graft copolymer which comprises dispersing or dissolving a polymer containing polynuclear aromatic hydrocarbon residues attached to the polymer chain, in a medium containing a polymerisable ethylenically unsaturated compound and initiating the polymerisation of the compound by the action of ultra-violet light upon the polymer containing the polynuclear aromatic hydrocarbon residues. The present invention also provides a graft copolymer consisting of main chains which have attached thereto polynuclear aromatic hydrocarbon residues and branch chains attached to the main chains via the polynuclear aromatic hydrocarbon residues and comprising polymerised units of an ethylenically unsaturated compound.

The polymer containing polynuclear aromatic hydrocarbon residues attached to the polymer chain is prepared by polymerising or copolymerising a polymerisable compound containing such a residue. Examples of polynuclear aromatic hydrocarbons are naphthalene, anthracene, phenanthrene, triphenylene, chrysene, pyrene, 3,4-benzphenanthrene, 1,2-benzanthracene, 1,2,5,6-dibenzanthracene, perylene, rubrene and coronene. Most suitably the polymers are obtained by polymerising the alkenyl derivatives of polynuclear aromatic compounds, for example, the vinyl naphthalenes, the vinyl anthracenes, the isopropenyl naphthalenes and the isopropenyl anthracenes.

If the polymer containing the polynuclear aromatic hydrocarbon residues is prepared by the homopolymerisation of the unsaturated derivative of the aromatic compound, it will be produced as a polymer containing a high proportion of polynuclear aromatic residues. However, the preferred starting materials for the production of graft copolymers are the copolymers of the unsaturated derivatives of the polynuclear aromatic compounds with other monomers which are copolymerisable therewith. A wide variety of monomers will copolymerise with the unsaturated derivatives of polynuclear aromatic compounds and can therefore be used in the production of starting polymers for the process of the present invention. For example styrene will copolymerise with vinyl naphthalene to give a series of suitable starting materials. Other examples of available monomers include vinyl acetate, acrylonitrile, methyl methacrylate and butadiene.

Useful graft copolymers are prepared from copolymers containing polynuclear aromatic residues which are spaced along a copolymer chain. For instance the starting material copolymer may be regarded as containing the structural units:

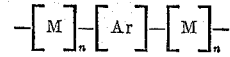

where Ar represents the polymerised unit of the unsaturated derivative of the polynuclear aromatic compound, M represents the monomer with which it is copolymerised and $n$ is the average number of monomer units between each polynuclear aromatic residue. The value of $n$ may vary greatly from 0, as is the case when the starting material is a homopolymer of the unsaturated derivative of the polynuclear aromatic compound, to, for instance, 100 or greater.

Any polymerisable ethylenically unsaturated compound whose polymerisation is initiated by the action of suitable ultra-violet light upon the polynuclear aromatic compound whose residues are in the starting material may be employed. The most suitable compounds possess at least one group having the structural formula $CH_2=C<$ in their molecular structures. If more than one polymerisable ethylenically unsaturated compound is employed, the graft copolymer side chains produced will themselves be copolymers in the usual sense. Examples of suitable compounds include vinyl acetate, styrene, acrylonitrile, methyl methacrylate and butadiene.

The process of the present invention is performed by irradiating a solution or dispersion of the polymer containing the polynuclear aromatic hydrocarbon residues in a medium containing the unsaturated compound with ultra-violet light. Most suitably, where possible, the medium consists of the unsaturated compound to be polymerised. It is preferable to carry out the process on a homogeneous reaction mixture which may be obtained easily if the ethylenically unsaturated compound or compounds employed are liquids and the polymer containing the aromatic hydrocarbon residues dissolves therein. Inert diluents can be employed. If the polymer is not readily dissolved in the unsaturated compound the process is facilitated by the use of a mutual inert solvent in the reaction medium.

The temperature at which the polymerisation reaction is allowed to proceed can be varied widely but it is preferably not raised to such an extent that the ethylenically unsaturated compound or compounds undergo thermal polymerisation to any substantial extent among themselves and thus do not form polymer chains attached to the starting polymer. Furthermore any polymerisation of the ethylenically unsaturated compounds among themselves means that the ultimate reaction mixture contains polymeric material other than graft copolymers and consequently, if it is desired to produce pure graft copolymers, it will be necessary to employ extra purification steps to remove unwanted non-graft material.

The graft copolymerisation reaction is initiated by the action of ultra-violet light on the polynuclear aromatic hydrocarbon residues present in the starting polymer. The term ultra-violet light is employed in its usual sense to denote radiation having a wave-length less than about 4,000 A. The practical lower limit of the wave-length of the radiation used is governed by the transmitting power of the material from which the reaction vessels etc. are made. For instance, soft glass will not transmit below about 3,500 A., Pyrex glass will not transmit below about 3,000 A., and quartz will not transmit below about 2,000 A. For most purposes radiation having a wave-length between about 2,000 A. and 4,000 A. is suitable. It is found that the absorption of ultra-violet light by these residues varies with the wave-length of the light employed and that the greater the absorption of light by the residues, the greater is the activation of the residues and the faster is the graft copolymerisation reaction. Although it is possible to initiate the graft copolymerisation reaction by the use of unfiltered ultra-violet light, it is preferable to filter the light used so that the polymerisation reaction mixture is only subjected to light of the optimum wave-length range. In this way the graft copolymerisation reaction is readily controlled and unwanted side reactions, which might be initiated by radiation of non-essential wave length, are prevented or reduced.

Any known source of ultra-violet light may be employed, for instance sunlight, but it is preferred to use an artifical source such as, for example, a mercury vapour lamp or a carbon electrode arc lamp. Any of the well known optical filters may be employed to screen the radiation and it should be borne in mind that normal or Pyrex glass absorbs radiation with a wave-length less than about 3,000 angstrom units and therefore special apparatus using silica glass or an equivalent transparent material must be employed for any windows etc. through which it is desired to pass light having wavelengths less than 3,000 angstrom units. The source of ultra-violet light and any optical filters and the like can be placed within or outside the polymerisation reaction vessel.

The choice of wavelength or wavelength range of most suitable ultra-violet light for the preparation of any particular graft copolymer depends primarily on the ultra-violet light absorption of the polynuclear aromatic residues present in the starting polymer and in practice this is often found to be approximately the same as the absorption of the pure polynuclear aromatic hydrocarbon from which the residue is derived. It is obviously desirable that the light used to initiate the graft copolymerisation should correspond to the maximum absorption of the polynuclear aromatic residues present, but it should be noted that, when the starting material polymer consists of a copolymer of an unsaturated polynuclear aromatic compound and another monomer, it is important that a unit in the copolymer derived from the other monomer should not absorb the radiation employed to a greater extent than a polynuclear aromatic residue. In practice it is found that the ultra-violet light absorption curve of polymerised units derived from the other monomer is approximately the same as the absorption curve of the pure homopolymer derived from the monomer and, therefore, by examining the latter and comparing it with the absorption curve of the polynuclear aromatic residues, it is possible to choose the most suitable wavelength range for the ultra-violet light to be used in the process of the present invention. Such light will be absorbed to a greater extent by a polynuclear aromatic residue than by a unit derived from the other monomer used in the preparation of the starting copolymer and may not necessarily be light of the wavelength which is most strongly absorbed by the polynuclear aromatic residues. For many polynuclear aromatic residues the maximum absorption occurs within the wavelength range 2,400 to 3,000 angstrom units and for instance, in the case of naphthalene residues the maximum absorption occurs between 2,400 and 2,800 angstrom units.

Any of the techniques usually employed in photopolymerisation reactions may be employed in the present invention. It is of course important that no compound present in the reaction mixture should absorb the ultra-violet light relied on to bring about the graft copolymerisation reaction to such an extent that the reaction is impaired or perhaps even prevented.

The graft copolymer is recovered by any of the techniques well known in the plastics art. If the graft copolymer is obtained mixed with polymeric material formed by the non-graft polymerisation of the ethylenically unsaturated compound, the purification of the product is often most conveniently carried out using a solvent technique. The formation of the graft copolymers in the process of the present invention is caused by the activation of the polynuclear aromatic residues present in the starting polymer by the ultra-violet light. These activated polynuclear aromatic residues initiate polymerisation reactions in which one end of the forming polymeric branch chain is chemically bonded to the initiating polynuclear aromatic residues.

The graft copolymers formed by the process of the present invention can be used for all those purposes for which previously known addition polymers have been used. They have particular utility because, by suitable adjustment of the starting materials, products with hitherto unknown combinations of properties can be formed. For instance it is well known that polystyrene and polyacrylonitrile have markedly different properties. Graft copolymers containing a styrene-type of main chain and branch chains of polyacrylonitrile show a blend of the properties of polystyrene and polyacrylonitrile.

The following examples illustrate the preparation of graft copolymers according to the present invention and the parts by weight and the parts by volume bear the same relationship to each other as the grams to millilitres.

*Example 1*

A styrene/α-vinyl naphthalene copolymer was prepared by heating monomeric styrene containing 1% by volume of α-vinyl naphthalene at 100° C. for 90 hours and then at 150° C. for a further 20 hours. The copolymer was dissolved in methylene chloride and precipitated by pouring into methyl alcohol. The filtered copolymer was dried to constant weight.

0.1 part by weight of this copolymer was dissolved in 10 parts by volume of acrylonitrile and the solution, in a quartz vessel, was irradiated with light from a low pressure mercury lamp screened to give radiation consisting mainly of wave-length 3130 A. The temperature of the solution was 25° C. After 15 minutes, a graft copolymer precipitated and the irradiation was continued for a further 15 minutes. 0.11 part by weight of polymer was collected and analysis showed that it contained 55% acrylonitrile units and had an approximate molecular weight of 150,000.

By way of comparison, an equal volume (10 parts)

of acrylonitrile not containing any copolymer was subjected to the same irradiation for the same period of time. No precipitation occurred. Similarly, the addition of 0.1 part by weight of polystyrene did not cause any precipitation to occur during 30 minutes' irradiation.

*Example 2*

14 parts by weight of the styrene/α-vinyl naphthalene copolymer described in Example 1 were dissolved in a mixture of 10 parts by volume of styrene and 10 parts by volume of acrylonitrile. The mixture was irradiated for 3 hours with screened light from a mercury lamp, the wavelength of the radiation being substantially in the range 3,000–3,200 A. At the end of this period, the graft copolymer was precipitated from the solution by the addition of methyl alcohol, filtered off and washed with methyl alcohol to give 40.5 parts by weight of product.

Analysis showed that the graft copolymer contained 25.8% acrylonitrile units and therefore must consist of the original styrene/α-vinyl naphthalene copolymer having grafted side chains consisting of normal copolymer chains of styrene and acrylonitrile.

The original copolymer was soluble in toluene and had a second order transition point at 84° C. and a refractive index of 1.589. The graft copolymer was insoluble in toluene, had a second order transition point at 98.5° C. and a refractive index of 1.569.

*Example 3*

1.8 parts by weight of the same styrene/α-vinyl naphthalene copolymer as used in Example 1 was dissolved in a mixture of 15 parts by volume of benzene and 35 parts by volume of vinyl acetate and the solution, maintained at 20° C., was irradiated for 3½ hours with light of wave-length 2,000–3,200 A. The resultant graft copolymer was recovered by the addition of MeOH and was filtered off and washed with methanol to yield 2 parts by weight of product. In the absence of the styrene/α-vinyl naphthalene copolymer a similar solution of vinyl acetate in benzene showed substantially no polymerisation on similar irradiation.

*Example 4*

0.042 part by weight of the styrene/α-vinyl naphthalene copolymer of Example 1 was dissolved in 10 parts by volume of methyl methacrylate and the mixture irradiated with light having essentially wave-lengths in the range 3,000 to 4,000 A. for one and a half hours. Methanol was added to the reaction mixture and 0.42 part by weight of polymeric material precipitated. (Under similar conditions, pure methyl methacrylate gave rise to 0.30 part by weight of polymethyl methacrylate.)

The polymeric product was fractionated by the slow addition of 35 parts by volume of methanol to a 1% solution of the product in benzene. The first fraction weighed 0.22 part by weight and was substantially pure polymethyl methacrylate. The second fraction, consisting primarily of the graft copolymer, weighed 0.19 part by weight and was insoluble and not attacked by acetone. By way of contrast both the original styrene/α-vinyl naphthalene copolymer and polymethyl methacrylate are swollen by acetone.

*Example 5*

0.16 part by weight of polyvinyl naphthalene were dissolved in a mixture of 20 parts by volume of acrylonitrile and 20 parts by volume of benzene and the solution, in a Pyrex glass reaction vessel and at a temperature of 51° C., was irradiated for 3 hours with the light from a high intensity mercury lamp. 0.365 part by weight of graft copolymer precipitated and on analysis was found to contain 89.4% by weight of polymerised acrylonitrile units.

Under identical conditions a mixture of acrylonitrile in benzene not containing any polyvinyl naphthalene did not precipitate any polymer.

I claim:

1. A process for the production of graft copolymers which comprises distributing a polymer containing polynuclear aromatic hydrocarbon residues attached to the polymer chain, in a medium containing a polymerisable ethylenically unsaturated monomer and initiating the polymerisation of the monomer by the action of ultraviolet light upon the polymer containing the polynuclear aromatic hydrocarbon residues.

2. A process as claimed in claim 1, wherein the polynuclear aromatic hydrocarbon residues are polymerised units selected from the group consisting of alkenyl naphthalene and anthracene units.

3. A process as claimed in claim 1, wherein the polymerisable ethylenically unsaturated monomer possesses at least one group having the structural formula $CH_2=C<$ in its molecular structure.

4. A process as claimed in claim 1, wherein a homogeneous reaction mixture is employed.

5. A process according to claim 1 wherein the polymer containing polynuclear aromatic hydrocarbon residues is a copolymer of an unsaturated polynuclear aromatic monomer and another monomer and the ultra-violet light used to initiate the graft polymerisation reaction is of such a wave length that it is absorbed to a greater extent by a polynuclear aromatic residue than by a polymerised unit derived from the other monomer.

References Cited in the file of this patent

UNITED STATES PATENTS

| | | |
|---|---|---|
| 2,505,067 | Sachs et al. | Apr. 25, 1950 |
| 2,610,962 | Smyers et al. | Sept. 16, 1952 |
| 2,666,025 | Nozaki | Jan. 12, 1954 |
| 2,735,830 | Coover | Feb. 21, 1956 |
| 2,738,319 | Kern | Mar. 13, 1956 |